(12) United States Patent
Ramanarayanan et al.

(10) Patent No.: US 9,195,741 B2
(45) Date of Patent: *Nov. 24, 2015

(54) TRIGGERING MUSIC ANSWER BOXES RELEVANT TO USER SEARCH QUERIES

(71) Applicant: Google Inc., Mountain View, CA (US)

(72) Inventors: Ganesh Ramanarayanan, Menlo Park, CA (US); Jun Gong, San Jose, CA (US); Murali Krishna Viswanathan, Mountain View, CA (US); Daphne Dembo, Palo Alto, CA (US); Pravir K. Gupta, Mountain View, CA (US); Tal Cohen, Haifa (IL); Lev Finkelstein, Netanya (IL); Adi Mano, Haifa (IL); Evan B. Roseman, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/313,856

(22) Filed: Jun. 24, 2014

(65) Prior Publication Data
US 2015/0161251 A1   Jun. 11, 2015

Related U.S. Application Data

(63) Continuation of application No. 12/914,967, filed on Oct. 28, 2010, now Pat. No. 8,788,514.

(60) Provisional application No. 61/255,809, filed on Oct. 28, 2009.

(51) Int. Cl.
G06F 17/30 (2006.01)

(52) U.S. Cl.
CPC ...... *G06F 17/30769* (2013.01); *G06F 17/3074* (2013.01); *G06F 17/30743* (2013.01); *G06F 17/30749* (2013.01); *G06F 17/30778* (2013.01); *G06F 17/30864* (2013.01)

(58) Field of Classification Search
USPC .................. 707/758, 710, 775, 748
See application file for complete search history.

(56) References Cited

U.S. PATENT DOCUMENTS

| | | | |
|---|---|---|---|
| 7,752,201 B2 * | 7/2010 | Anderson et al. | 707/731 |
| 8,019,764 B1 | 9/2011 | Nucci et al. | |
| 8,073,854 B2 * | 12/2011 | Whitman et al. | 707/749 |
| 8,171,020 B1 * | 5/2012 | Kacholia et al. | 707/722 |
| 2003/0115333 A1 | 6/2003 | Cohen et al. | |
| 2005/0165744 A1 | 7/2005 | Taylor et al. | |
| 2008/0228720 A1 | 9/2008 | Mukherjee et al. | |
| 2008/0301093 A1 | 12/2008 | Haugen et al. | |
| 2009/0077052 A1 | 3/2009 | Farrelly | |
| 2009/0164895 A1 | 6/2009 | Baeza-Yates et al. | |
| 2009/0287677 A1 | 11/2009 | Markov et al. | |
| 2010/0217755 A1 | 8/2010 | Vignoli | |
| 2010/0293174 A1 | 11/2010 | Bennett et al. | |

* cited by examiner

*Primary Examiner* — Cam-Linh Nguyen
(74) *Attorney, Agent, or Firm* — Fish & Richardson P.C.

(57) ABSTRACT

Methods, systems, and apparatus, including computer programs encoded on computer storage media, for triggering music answer boxes. In one aspect, a method includes receiving a query, obtaining a plurality of search results responsive to the query, the search results being results from a search of web resources on the Internet, and determining from the plurality of search results that the query is a music query. Music data for a song responsive to the query is obtained, where the music data comprises a Uniform Resource Locator (URL) of song content of the song on the Internet. A music answer box is generated for the query, where the music answer box comprises the music data and a link to the URL of the song content, and the music answer box is provided in addition to search results.

26 Claims, 8 Drawing Sheets

TRIGGERING MUSIC ANSWER BOXES RELEVANT TO USER SEARCH QUERIES

CROSS-REFERENCE TO RELATED APPLICATIONS

This application is a continuation of, and claims priority to, pending U.S. patent application Ser. No. 12/914,967, filed on Oct. 28, 2010, entitled "Triggering Music Answer Boxes Relevant To User Search Queries," which claims priority to U.S. Provisional Patent Application No. 61/255,809, filed Oct. 28, 2009, entitled "Triggering Music Answer Boxes Relevant To User Search Queries," the entirety of which is herein incorporated by reference.

BACKGROUND

This specification relates to providing information relevant to user search queries.

Internet search engines identify resources, e.g., Web pages, images, text documents, and multimedia content, in response to queries submitted by users and present information about the resources in a manner that is useful to the users.

Users of search engines are often looking for an answer to a specific question, rather than a listing of resources. For example, users may want to know what the weather is in a particular location, what the definition of a particular word is, how to convert between two time zones, or the product of multiplying two numbers.

An answer box is a formatted presentation of content that is relevant to the query. For example, if the user's query refers to weather in a particular location, the answer box can include a forecast of weather in the particular location. An answer box has a category that is one of a predefined group of categories, and is formatted according to a template specific to its category. An answer box can also be associated with code that defines how content for the answer box is obtained. The code can be, for example, scripts or code identifying a back end server from which the content is received.

SUMMARY

This specification describes technologies relating to presenting music answer boxes.

In general, one aspect of the subject matter described in this specification can be embodied in methods that include the actions of receiving a query, obtaining a plurality of search results responsive to the query, the search results being results from a search of web resources on the Internet, determining from the plurality of search results that the query is a music query, obtaining music data for a song responsive to the query, where the music data comprises a Uniform Resource Locator (URL) of song content of the song on the Internet, generating a music answer box for the query, where the music answer box comprises the music data and a link to the URL of the song content, and providing the music answer box in addition to two or more of the search results. Other embodiments of this aspect include corresponding systems, apparatus, and computer programs recorded on computer storage devices, each configured to perform the operations of the methods.

These and other embodiments can each optionally include one or more of the following features. Determining that the query is a music query further comprises comparing the received query to data in a lyrics index database. Comparing the received query to data in a lyrics index database comprises searching the lyrics index database to identify song lyrics matching one or more terms of the query. Determining from the plurality of search results that the query is a music query comprises identifying a number of the search results as music search results and comparing the number to a threshold. Identifying a search result as a music search result comprises comparing a website identified by the search result to a list of music sites. The list of music sites comprises a list of websites that provide access to music or music information. The list of music sites further comprises a list of websites that frequently co-occur with websites identified by search results responsive to previously identified music queries.

Identifying a number of search results as music search results comprises analyzing a query log comprising stored queries and stored search results responsive to the stored queries. The music answer box comprises information associated with one or more songs responsive to the query. The information associated with each song comprises a name of a musical artist, a name of a musical work, or a title of a musical album. The music answer box further comprises a link for each of one or more songs responsive to the query, where each respective link is directed to a site where the song is available for purchase. The music answer box further comprises music data and respective links for each of one or more additional songs. Each link actuates streaming music content corresponding to the song. Providing the music answer box further comprises providing a streaming user interface that is separate from a search results user interface.

In general, another aspect of the subject matter described in this specification can be embodied in methods that include the actions of receiving a search request to perform a search of web resources, the request comprising a query, determining that the query comprises one or more terms corresponding to a name of a musical artist, a name of a musical work, a title of a musical album, or lyrics from a musical work, obtaining music data for a musical work that matches the query, where the music data comprises a Uniform Resource Identifier (URI) to content of the musical work, generating a music answer box for the query, where the music answer box comprises the music data and a link to the URI to the content of the musical work, and providing the music answer box as at least part of a response to the search request. Other embodiments of this aspect include corresponding systems, apparatus, and computer programs recorded on computer storage devices, each configured to perform the operations of the methods.

These and other embodiments can each optionally include one or more of the following features. The actions further comprise performing a search of the web based on the query, and providing search results responsive to the query from the search of web as a further part of the response to the search request. The URI is a Uniform Resource Locator (URL). Determining that the query comprises one or more terms corresponding to a name of a musical artist, a name of a musical work, a title of a musical album, or lyrics from a musical work further comprises comparing the received query to data in a lyrics index database. Comparing the received query to data in a lyrics index database comprises searching the lyrics index database to identify song lyrics matching one or more terms of the query. Determining that the query comprises one or more terms corresponding to a name of a musical artist, a name of a musical work, a title of a musical album, or lyrics from a musical work comprises identifying a number of the search results as music search results and comparing the number to a threshold. Identifying a search result as a music search result comprises comparing a website identified by the search result to a list of music sites. The list of music sites comprises a list of websites that provide access to music or music information. Determining that the query comprises one or more terms corresponding to a name of a musical artist, a name of a musical work, a title of a musical album, or lyrics from a musical work comprises applying pattern matching to a URL or title of a website in the search results.

Particular embodiments of the subject matter described in this specification can be implemented so as to realize one or more of the following advantages. Users can be presented with relevant information about music referenced in, or related to, their search queries. Users can be provided with a richer music search experience through tools that allow them to easily obtain answers to their music questions. Users can easily stream music referenced in their search queries, or music related to their search queries. Users can be provided with convenient ways to purchase music they have searched for.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
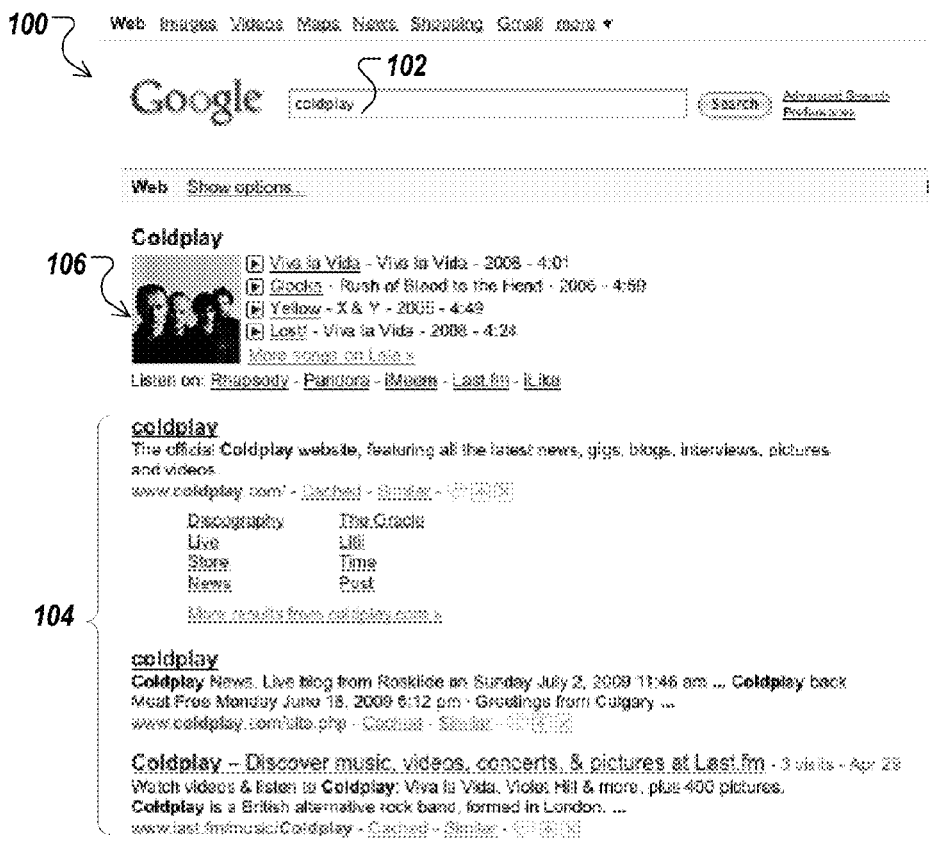
FIG. 1 illustrates an example search results page.

FIG. 1 illustrates an example search results page 100 for the query "coldplay" 102. The search results page 100 includes search results 104 that are responsive to the query. These search results include, for example, the official website of the band Coldplay.

The search results page 100 also includes a music answer box 106. In general, a music answer box provides music-related information responsive to a music query. A query can be considered a music query either because it contains a combination of song, artist, or album terms, or because it contains song lyrics. For example, a music answer box can provide information associated with one or more songs responsive to a query. A song can be responsive to a query, for example, because the name of the song is included in the query, because the name of the artist who recorded the song is included in the query, because the name of the album on which the song was released is included in the query, or because song lyrics for the song are included in the query. The information associated with each song can include the name of the artist that recorded the song, the title of the album on which the song was released, and the title of the song. Music answer boxes can also provide additional information including, for example, additional information on a band or an album.

The music answer box 106 illustrated in FIG. 1 is responsive to a query for the name of the band "Coldplay." Therefore, the music answer box 106 includes information about the band and songs recorded by the band. This information includes the name of the band ("Coldplay"), a picture of the band, and the titles of four of the band's songs: "Viva la Vida," "Clocks," "Yellow," and "Lost!." The title of each song is followed by additional information about the song. Specifically, each song title is followed by the name of the album on which the song was released, the date of the album, and the length of the song. For example, the song "Yellow" was released on the album "X&Y" in the year 2005, and has a length of four minutes and forty-nine seconds. The song titles that are displayed can be selected, for example, according to rankings provided by the providers of the songs, or can be selected according to user preferences. For example, the highest ranked songs, or the most preferred songs can be presented.

The music answer box 106 also includes a link for each song listed. When a user selects, e.g., clicks on, the link for a particular song, streaming music content corresponding to the song is actuated. In some implementations, the content is streamed in a user interface window that is separate from the window where the music answer box is presented. The streaming music content can be provided by various music providers. For example, in FIG. 1, the music is streamed from the music provider "Lala." In some implementations, the music provider is chosen from multiple music providers to balance load among providers. For example, the music provider can be chosen from two possible music providers by assigning each user a cookie, and picking the first music provider when the cookie is associated with an even value and the second provider when the cookie is associated with an odd value.

Users can receive additional information about the artist, or particular songs, using the links at the bottom of the music answer box 106. These links can either allow users to stream music from different music providers, or can direct users to a web page of the music provider that provides more information on the artist, album, or song, and may allow the user to purchase songs/albums or stream music. Alternatively, or additionally, the music answer box 106 can include a link for each song that is directed to a site where the song is available for purchase.

Figure 2:
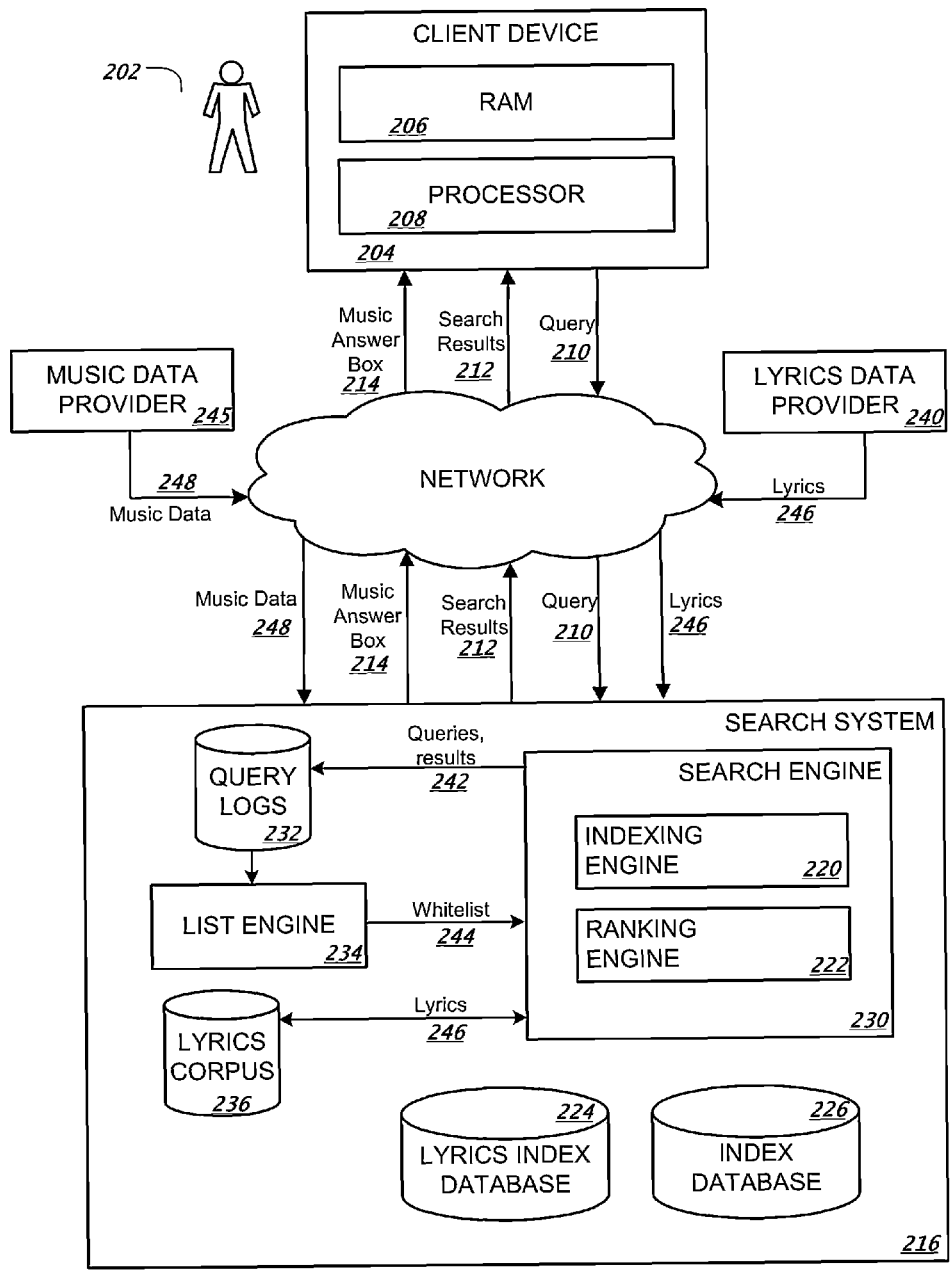
FIG. 2 is a diagram of an example search system for providing music answer boxes in response to a music query.

FIG. 2 is a diagram of an example search system for providing music answer boxes in response to a music query.

A user 202 can interact with the search system 216 through a client device 204. For example, the client 204 can be a computer coupled to the search system 216 through a local area network (LAN) or wide area network (WAN), e.g., the Internet. The client device 204 will generally include a random access memory (RAM) 206 and a processor 208.

A user 202 can submit a query 210 to a search engine 230 within a search system 216. When the user 202 submits a query 210, the query 210 is transmitted through a network to the search system 216. The search system 216 includes an index database 226 and a search engine 230. The search system 216 also includes a lyrics index database 224. The search system 216 responds to the query 210 by generating search results 212, which are transmitted through the network to the client device 204 in a form that can be presented to the user 202 (e.g., as a search results web page to be displayed in a web browser running on the client device 204). If the query 210 is a music query, the search system can also transmit a music answer box 214 through the network to the client device.

When the query 210 is received by the search engine 230, the search engine 230 identifies resources that match the query 210. The search engine 230 will generally include an indexing engine 220 that indexes resources (e.g., web pages, images, or news articles on the Internet) found in a corpus (e.g., a collection or repository of content) and an index database 226 that stores the index information. The search engine can also include a ranking engine 222 (or other software) to rank the resources that match the query 210. The indexing and ranking of the resources can be performed using conventional techniques. The search engine 230 can transmit the search results 212 through the network to the client device 204 for presentation to the user 202.

The indexing engine 220 can also index lyrics resources 246 from a lyrics corpus 236 into a lyrics index database 224. In some implementations, the lyrics index database can be a portion of the index database 226. The lyrics corpus 236 can be wholly contained within search system 224. In some other implementations, lyrics resources 246 are obtained by indexing engine 220 over the network from one or more lyrics data providers 240.

Received queries and their respective returned results 242 can be stored in query logs 232. The query log data can be anonymized before it is stored or used so that personally identifiable data is removed. For example, a user's identity may be anonymized so that no personally identifiable information can be determined for the user, and the data, if compromised, cannot be associated with a particular user or user identifier. The query logs can be parsed by the list engine 234 to determine which queries are music queries.

The list engine 234 generates a whitelist 244 used to provide the music answer box 214 in response to a music query. In some implementations, the music data 248 needed to populate the music answer box is provided over the network by a music data provider 245. The music data 248 can include, for example, the artist, song, duration, a thumbnail, and a music URL to be used for the music answer box. The list engine 234 determines which queries are music queries by parsing the query logs 232 and stores the music queries and associated music data 248 in a whitelist 244.

Figure 3:
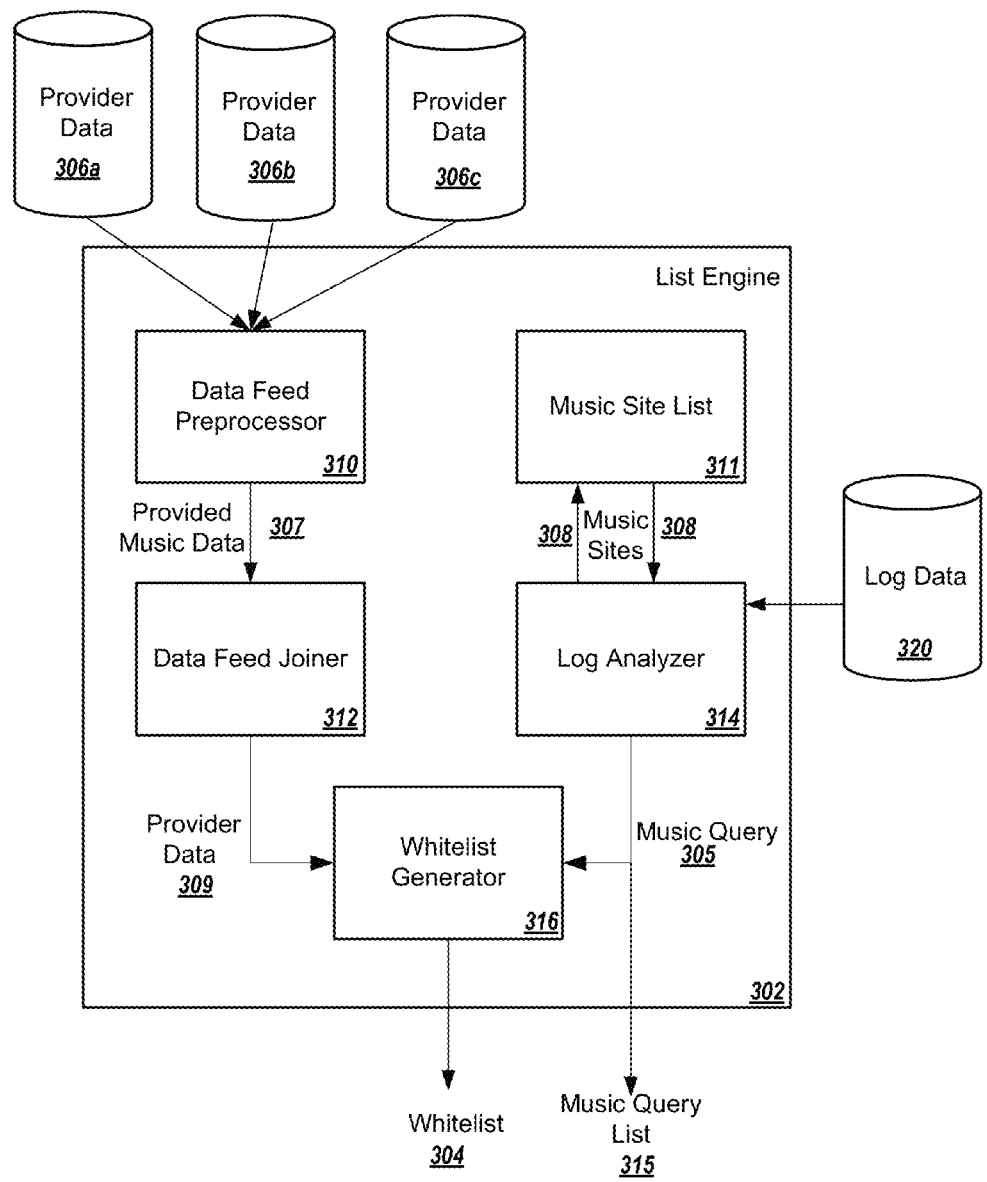
FIG. 3 illustrates an example architecture of a list engine.

FIG. 3 is a diagram of an example architecture of a list engine 302. The list engine 302 generates a whitelist 304 for use in triggering music answer boxes, as described above with reference to FIG. 2.

For illustrative purposes, the list engine 302 shown in FIG. 3 builds two lists: a whitelist 304 that includes song titles, artist names, and album titles, and a music query list 315 that includes queries identified as music queries. However, in some alternative implementations, the list engine 302 generates different lists, or lists that include a subset of this data, or additional data.

The list engine 302 processes data from two sources to generate the whitelist 304 and the music query list 315. These sources include provider data 306a, 306b, and 306c, and log data 320. The provider data 306a-c is data received by one or more music providers. A music provider stores a library of songs and allows users to either stream songs or download songs from the music provider library. The provider data 306 received from each provider includes details on the songs available from the provider's library. For example, the provider data might specify the title of each song, the name of the artist for each song, the album on which each song was released, and the length of the song. The provider data 306 can also include information on how to play a particular song in the provider's catalog, for example, a URL address that links to the song. Other provider data can also be received, for example, data including an image of the cover of the album on which the song was released and a ranking of the song. The ranking can be, for example, how often the song is streamed and/or purchased from the provider.

The list engine 302 can receive the provider data 306 from multiple providers. For example, in FIG. 3, the list engine 302 receives provider data 306a from one provider, provider data 306b from another provider, and provider data 306c from yet another provider. The provider data 306 from each provider may be formatted differently. Therefore, the list engine 302 uses a data feed preprocessor 310 to standardize the data. The data feed preprocessor 310 standardizes the data by formatting the data received from each provider into a standard format.

For example, the data feed preprocessor 310 can include a provider-specific formatter for each provider. The provider-specific formatter can specify formatting changes required to translate between the provider data for a particular provider and the standard format of the data required by the list engine 302.

Once the provider data 306 has been preprocessed, the standardized data is processed by a data feed joiner 312. The data feed joiner 312 groups the data received from different providers for a given artist, album, or song into one record. For example, the data feed joiner 312 can normalize the case of artist, album, and song names, and can remove diacritical marks and punctuation. The data feed joiner 312 can also identify and merge data for a given artist, album, or song.

The log data 320 includes data for various search queries. The log data 320 for a given query can include, for example, an identification of search results responsive to the query and/or other queries associated with the query. Search results responsive to the query can be generated, for example, by a search engine. Associated queries for a given query can be identified, for example, from an analysis of user search histories. The search history data can be anonymized before it is stored or used so that personally identifiable data is removed. For example, a user's identity may be anonymized so that no personally identifiable information can be determined for the user, and the data, if compromised, cannot be associated with a particular user or user identifier. For example, an associated query for a given query can be a query refinement entered by a user after a user submits the given query, or can be a query suggestion selected by a user after the user submits the given query.

A log analyzer 314 analyzes the log data 320 to identify one or more queries to add to the music query list 315. The log analyzer 314 then outputs the resulting music query list 315. The log analyzer 314 can identify a query to add to the music query list 315 based on search results associated with the query in the log data 320 or associated queries associated with the query in the log data 320.

The log analyzer 314 identifies a query to add to the music query list 315 based on search results associated with the query by analyzing the search results responsive to the query to determine whether a threshold number of the search results are music search results. The threshold can be determined, for example, empirically. A music search result is a search result that references a music site 308. Music sites are websites that allows users to stream or otherwise access music content or a search result for a website that provides users with information about artists, albums, songs, and/or music. A list of music sites can be maintained in music site list 311. In some implementations, the music site list 311 is initially seeded with a list of popular music sites.

Music search results can also be search results that frequently co-occur with other music search results. Two search results frequently co-occur when they are presented to a user as responsive search results for the same query more than a threshold number of times. Co-occurring search results can be identified, for example, from an analysis of data that associates queries submitted by users with the search results presented to users in response to those queries. In some implementations, a website referenced by search results that frequently co-occur with music search results is identified as an additional music site 308 and added to music site list 311.

The system can determine whether a search result for a given web page is a music search result by comparing a web address for the web page to a list of web pages meeting the criteria described above. In some implementations, the music web pages are ranked based on a user preference indicator, for example, click through rate, and only a top number of the web pages are included on the list. Alternatively, or additionally, the log analyzer 314 can determine that a search result is a musical search result by applying pattern matching to the URL or title of the website of each search result and a snippet, e.g., a piece of representative text, extracted from the search result to identify web pages that include information on music and artists, or that allow users to stream or otherwise access musical content. The log analyzer 314 can also use pattern matching applied to the URL or title of a music website to classify terms in a query as an artist, a song, or an album.

The log analyzer 314 can also identify that a query should be added to the whitelist based on queries associated with the query. For example, the log analyzer can determine whether queries associated with a given query are musical queries, using the techniques described above. If an associated query is a music query (or a threshold number of associated queries are musical queries), then the given query is added to the music query list 305.

The whitelist generator 316 receives the joined data from the data feed joiner 312 and the log analyzer 314 and generates a whitelist 304. The whitelist 304 includes the artist, album, and song title information identified from the provider data 309. The whitelist can also include combinations of data identified from the provider data 306, for example, pairs of song titles and artist names. In some implementations, the whitelist is a list of {key, value} pairs, where the key is a music query 305 from the log analyzer 314, and the value is the artist, song, or album information from the provider data 309. Alternatively or additionally, the whitelist can include queries that have been pre identified as having associated music results. If a received query matches any of the whitelist keys, the system can trigger a music answer box with music data in the corresponding whitelist value.

In some cases, a music query 305 classified into artist, song, or album information by log analyzer 314 will not match any information in provider data 309. In some implementations these unmatched music queries are not added to the whitelist 304. In other cases, provider data 309 will not match any queries identified by the log analyzer 314 as music queries. In some implementations, the unmatched provider data 309 is not added to the whitelist 304.

Figure 4:
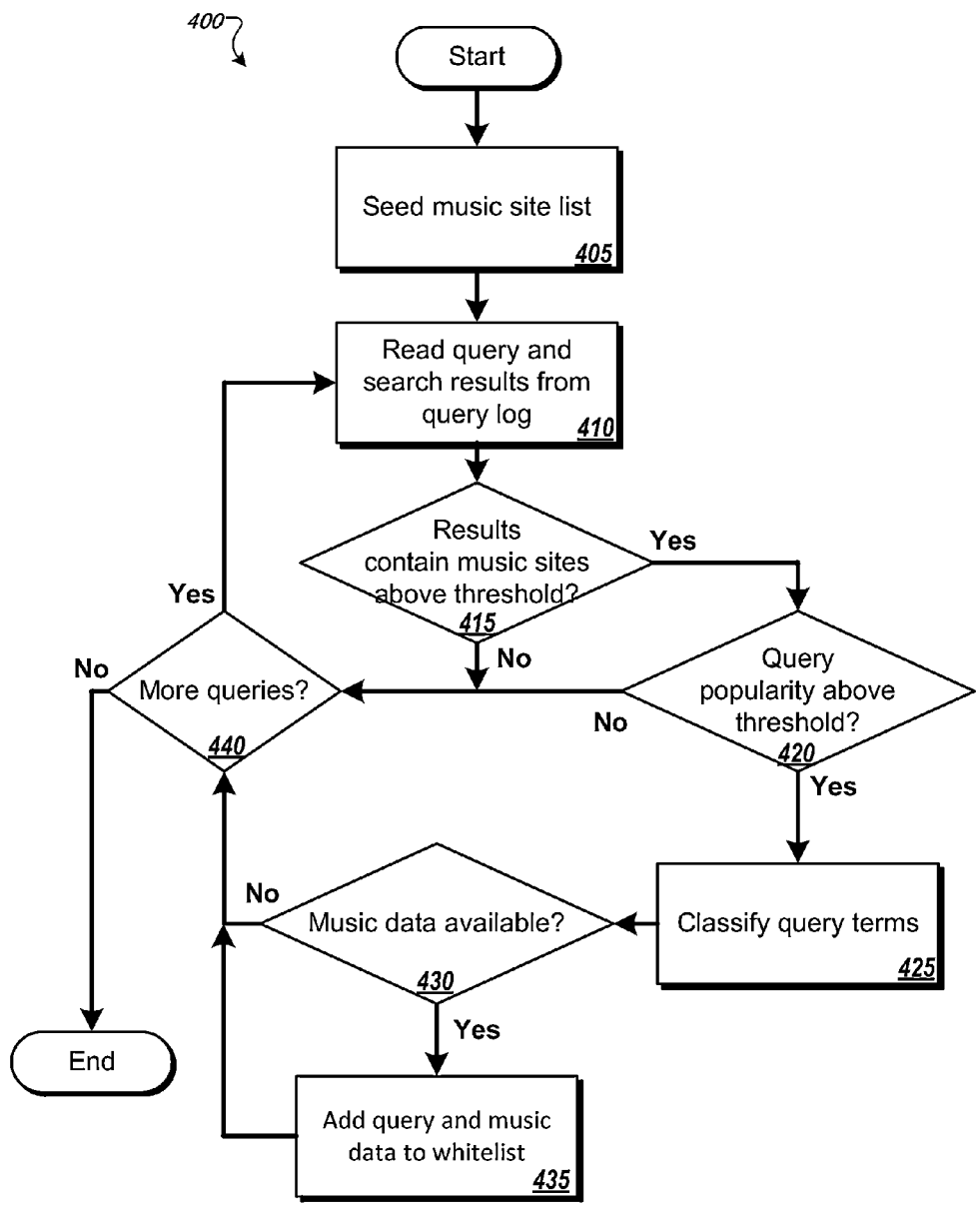
FIG. 4 is a flowchart of an example process for generating a whitelist.

FIG. 4 is a flowchart of an example process 400 for generating a whitelist. The whitelist can combine music queries parsed from query logs with music data provided by music data providers. The whitelist can be used to trigger a music answer box in response to a music query. The process will be described as being performed by a computer system that includes one or more computers, e.g., the search system described above.

The system seeds a music site list 405. The music site list contains a list of websites that provide music information or music content. In some implementations, the system determines which search results are music search results by comparing the website referenced by the search result to the websites in the music site list.

The system reads a query and corresponding search results from the query logs 410. In some implementations the query logs store previously received queries and a subset of the highest-ranked search results corresponding to the query. The query log data can be anonymized before it is stored or used as described above.

The system checks whether the search results from the query log contain more than a threshold number of music sites 415. To make this determination, the system analyzes each of a number of the top-ranked search results (e.g., top 10 results) to determine whether the search result is a music search result. A music search result is a search result for a web page that allows users to stream or otherwise access music. The system then determines whether a sufficient number of the top-ranked search results are musical search results, for example, by comparing the number of top-ranked search results that are musical search results to a threshold. If the search results contain less than the threshold number of music sites, the query is not considered a music query (branch to 440). If the search results contain more than the threshold number of music sites, additional conditions can be checked.

The system checks whether the popularity of the query is above a threshold (420). In some implementations, the popularity of a particular query is the frequency that the query is received by the search system. If the query does not meet the popularity threshold, the query will not be added to the whitelist (branch to 440). If the query does meet the popularity threshold, the system classifies terms in the query (425). A query may contain any combination of artist, song, or album terms. For example, a query may contain the terms "coldplay yellow." The system would classify the term "coldplay" as an artist and the term "yellow" as a song. In some implementations, terms are classified by applying pattern matching to the URL or title of websites referenced in the search results.

The system checks whether music provider data is available (430). In some implementations, a whitelist will contain only music data available from music data providers. If no music data is available for the artist, song, or album identified in the classified music query, the query and its associated information will not be added to the whitelist (branch to 440).

The system adds the query and its music data to the whitelist (435). In some implementations, the whitelist is a list of {key, value} pairs, where the key is the music query and the value is the music data from the music data providers.

The system checks whether additional queries from the query logs are to be parsed (440). If additional queries remain to be parsed, the process proceeds to 410 to read another query and corresponding search results from the query logs. If no additional queries remain, the process ends.

Figure 5:
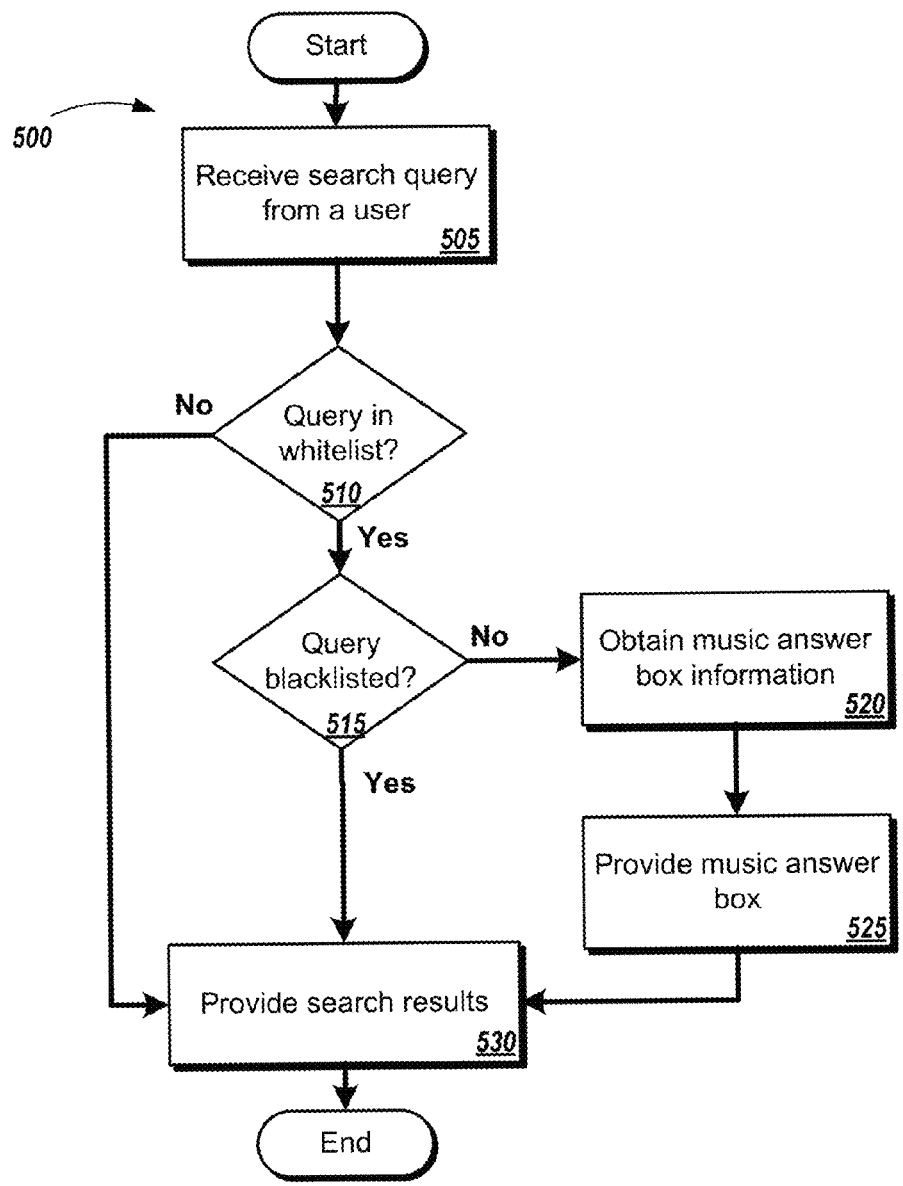
FIG. 5 is a flowchart of an example process 500 for triggering a music answer box.

FIG. 5 is a flowchart of an example process 500 for triggering a music answer box. A music answer box can be triggered in response to a received music query. A query can be identified as a music query either because it contains a combination of artist, album, or song terms, or because it contains song lyrics. FIG. 5 illustrates an example process for triggering a music answer box in response to a query containing a combination of artist, album, or song terms. The process will be described as being performed by a computer system that includes one or more computers, e.g., a search system as described above.

The system receives a search query from a user 505. The query may include a combination of artist, album, or song terms. The user can submit the search query to the system, for example, through a search engine user interface presented on a user device (e.g., a computer or mobile device). The search engine user interface can be a search web page or an application interface. The search engine user interface includes a query input field where a user enters the query and a control element (e.g., a user interface button) that the user can use to submit a search request. The query input field can be, for example, a field in a search engine web page, a field in a toolbar running in a web browser of the user, or a field in a search application running on the user device. The user can use the control element to submit a search request for text input, for example, by pressing a search button in the search engine user interface, pressing the "enter" key in the query input field, or otherwise indicating that the search engine should identify search results responsive to the input in the query input field.

The system compares the terms of the query with queries stored in the whitelist (510). If the query does not match music queries stored in the whitelist, a music answer box will not be triggered (branch to 530). A query term matches a query on the whitelist when it is identical to the query on the whitelist. In some implementations, the system performs query rewriting and/or query expansion before performing the matching. In some implementations, the system matches query terms that are similar to queries on the whitelist. Two terms are similar when they differ only in small changes in spelling or word form. For example, "color" and "colour" could be considered similar because they are different spellings of the same word. Similarly, "read" and "reads" could be considered similar, since one is the plural form of the other. If the query does match a music query stored in the whitelist, additional conditions can be checked.

In some implementations, even when one or more terms of the query match terms on the whitelist, the system verifies that the query is a music query before triggering the answer box. The system can use one or more of signals to decide whether the query is a music query. For example, the system can provide the signals to a linear classifier that determines whether the query is a music query from the signals. One example signal is a classification of the terms of the query. For example, the system can submit the terms of the query to a classifier that classifies the terms according to a taxonomy. Another example signal is whether the query returns results in a list of known music search results.

If the query is in the whitelist, the system compares the query to a query blacklist (515). In some instances, a music answer box will not be triggered because regular search results may be more relevant to the query than a music answer box. For example, if an artist has recently been in the news, the artist query can be added to blacklist to prevent triggering a music answer box. If the query is in the blacklist, the music answer box will not be triggered (branch to 530).

If the query is not in the blacklist, the system obtains music answer box information (520). In some implementations, the information required to trigger the music answer box is stored in the whitelist as a {key, value} pair. In some implementations, the system first identifies an appropriate parameter for the answer box. The parameter is used to obtain an answer box with the appropriate content. For example, if the query is about the band Coldplay, then the appropriate parameter could be "Coldplay." In some implementations, when the system determines that the music answer box is triggered by comparing terms of the query to a whitelist, the appropriate parameter is the term or terms of the query that matched the terms on the whitelist.

Once the system has identified the appropriate parameter for the answer box, the system obtains the answer box. How the system obtains the answer box is dependent on whether the answer box is static or dynamic. Static answer boxes are answer boxes whose content is predetermined. Static answer boxes are stored, for example, in a data storage storing answer boxes. In contrast, dynamic answer boxes are answer boxes whose content is obtained as needed. Some answer boxes can be static at some points in time, and dynamic at other points in time. For example, the content in an answer box can be updated according to a regular schedule. When the content needs to be updated, the answer box is a dynamic answer box. However, once the content is updated, the content is cached and the answer box is a static answer box, until the time for the next update.

When the answer box is static, the system obtains the music answer box from the data storage where it is stored. The music answer box can be associated with the parameter that triggers the music answer box to allow for easy retrieval from storage.

When the music answer box is dynamic, the system obtains content responsive to the music category of the music answer box and the parameter of the answer box, for example, according to rules associated with the music category of the answer box. The system can obtain the content from a back-end server that manages data for music answer boxes. Alternatively, an association engine can receive the content from a cache that caches content for recently obtained music answer boxes. Once the system obtains the content, the association engine formats the content according to a template associated with music answer boxes.

The system provides the music answer box responsive to the query (525). The system provides the music answer box by sending data representing the music answer box to the user device for presentation in the search engine user interface. The user device can then present the music answer box to the user, for example, by displaying the music answer box on a display device.

The system provides search results (530). The user device can present the music answer box along with search results responsive to the query. The music answer box will not be provided if the query was not in the whitelist or was in the blacklist. Example answer box presentations are described above with reference to FIG. 1, and below with reference to FIGS. 7A-7D.

Figure 6:
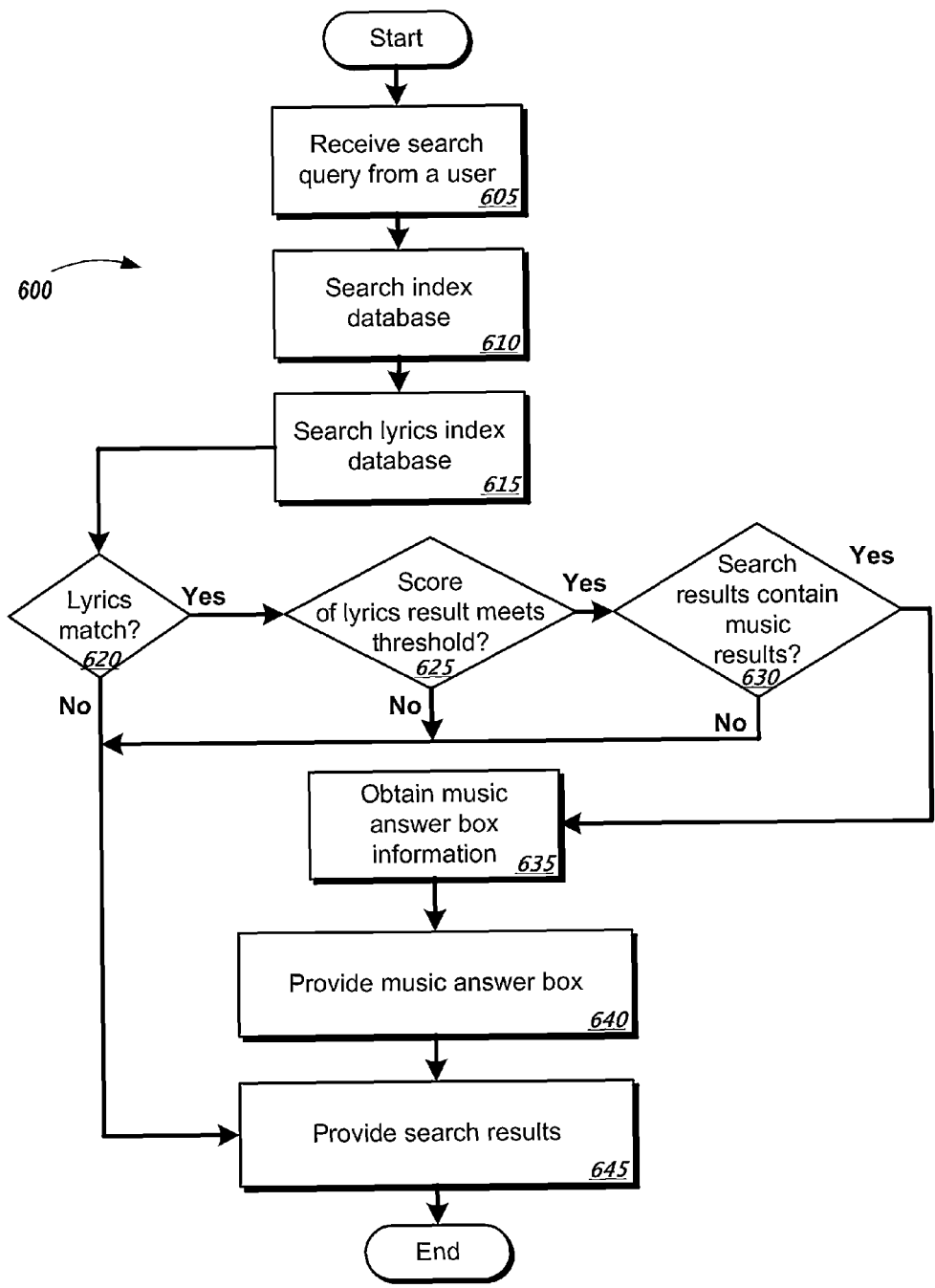
FIG. 6 is a flowchart of an example process for triggering a music answer box in response to a music query that contains lyrics.

FIG. 6 is a flowchart of an example process for triggering a music answer box in response to a music query that contains lyrics. A query can be identified as a music query because it contains song lyrics. A music answer box is triggered by searching a lyrics index database created from a lyrics corpus, for example, the lyrics corpus 232 in FIG. 2. If the query returns a match in the lyrics index database, a music answer box can be triggered. The process will be described as being performed by a computer system that includes one or more computers, e.g., the search system described above A search query is received (605). For example, a user can submit a search query thought a search interface of a search system. An index database (e.g., index database 226 as shown in FIG. 2) is searched to obtain search results responsive to the search query (610).

A lyrics index database (e.g., lyrics index database 224 as shown in FIG. 2) is also searched to determine if the search query matches lyrics in the lyrics index database (615).

The system determines whether the query matches lyrics in the lyrics index database (620). If, the search query does not match lyrics in the lyrics index database, the system provides regular search results (645) where a music answer box is not be triggered along with the regular search results.

If the search query matches lyrics in the lyrics index database, the system checks a score of the lyrics result (625). In some implementations, the score of the lyrics result is based on a popularity of the song as provided by the lyrics data provider. In some other implementations, the score must meet a threshold in order to trigger the music answer box. If the score does not meet the threshold, the the system again provides the regular search results (645).

If the score meets the threshold, the system checks whether search results returned from the index database are music results (630). In some implementations, this check for music results contained in the regular search results prevents over-triggering music answer boxes for lyrics that are common phrases. For example, the query "it's all I can do" may return a match for lyrics in the lyrics index database. However, the regular search results may include many other types of results in addition to music search results because the phrase is not specific to music. Therefore, the music answer box will not be triggered. In contrast, the query "In the jingle jangle morning I'll come followin' you" may return a match in the lyrics index database as well as return multiple regular search results that are music search results. Therefore, the music answer box will be triggered accordingly. If the search results from the index database are not music results, the regular search results are provided (645) without triggering a music answer box.

If the search results contain music results, the system obtains information needed to display the music answer box (635). In some implementations, this information is obtained from a whitelist and includes the artist, song, duration, a thumbnail, and a song URL.

The system provides the music answer box (640). The system also provides regular search results along with the music answer box (645).

Figure 7A:
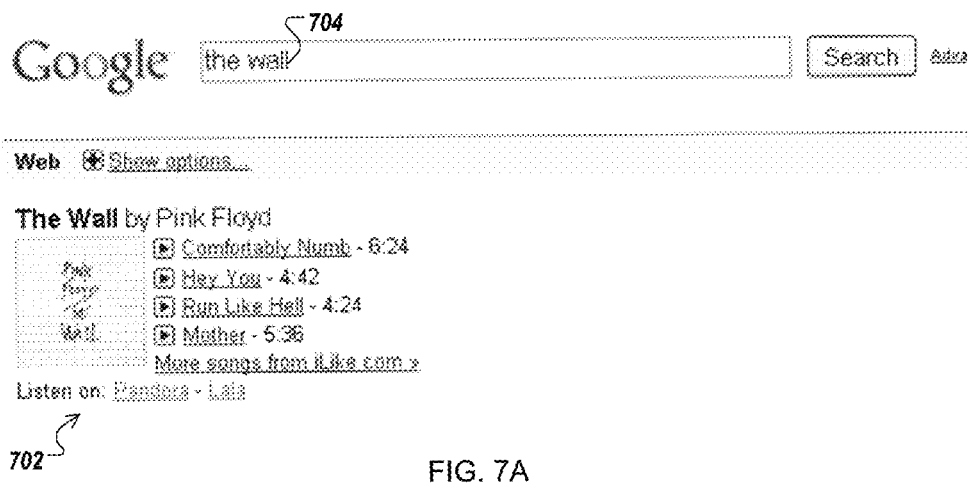
FIGS. 7A-7D illustrate example music answer boxes presented in response to queries submitted by users.

FIGS. 7A-6D illustrate example music answer boxes presented in response to queries submitted by users. The example music answer boxes can be triggered and obtained, for example, using the techniques described above. In some implementations, the example music answer boxes are presented along with other search results responsive to the respective queries.

FIG. 7A illustrates a music answer box 602 presented in response to a query 604 including an album name ("the wall"). The answer box 602 includes the name of the album ("The Wall"), the name of the artist who recorded the album ("Pink Floyd") and information for several songs from the album ("Comfortably Numb," "Hey You," "Run Like Hell," and "Mother"). The answer box 602 includes links that allow users to stream the songs from the album from provider web pages. The answer box 602 also includes a link to view additional songs from the album.

Figure 7B:
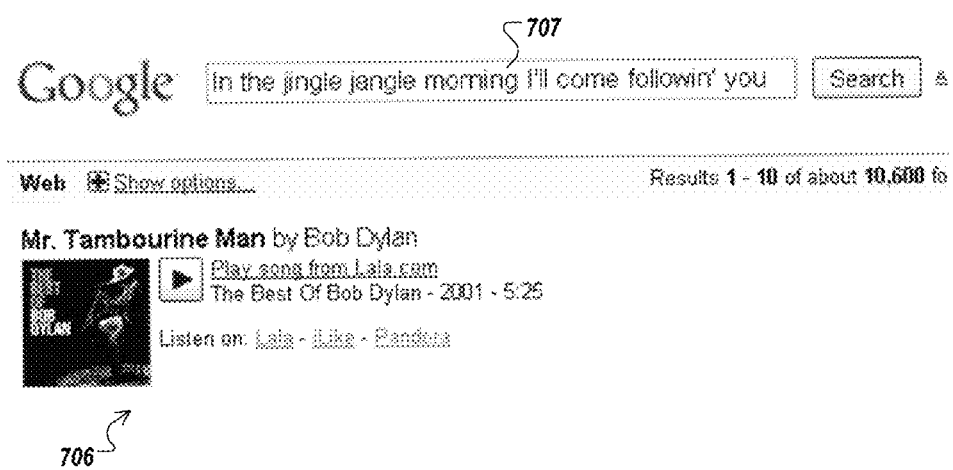

FIG. 7B illustrates a music answer box 606 presented in response to a query 608 that includes song lyrics. The music answer box 606 identifies the name of the song ("Mr. Tambourine Man"), the artist who recorded the song ("Bob Dylan") and includes a link to allow the user to play the song from Lala.com. Below the link, the music answer box 606 also identifies the album on which the song was released ("The Best of Bob Dylan") as well as the date of the album (2001) and the length of the song (five minutes, twenty-five seconds).

Figure 7C:

FIG. 7C illustrates a music answer box 610 presented in response to a query 612 that includes an artist's name. The answer box 610 identifies the name of the artist ("Enya"), and has links to play several songs recorded by the artist. Each link is presented next to additional information on the song, including the album name, date of the album, and the length of the song.

Figure 7D:
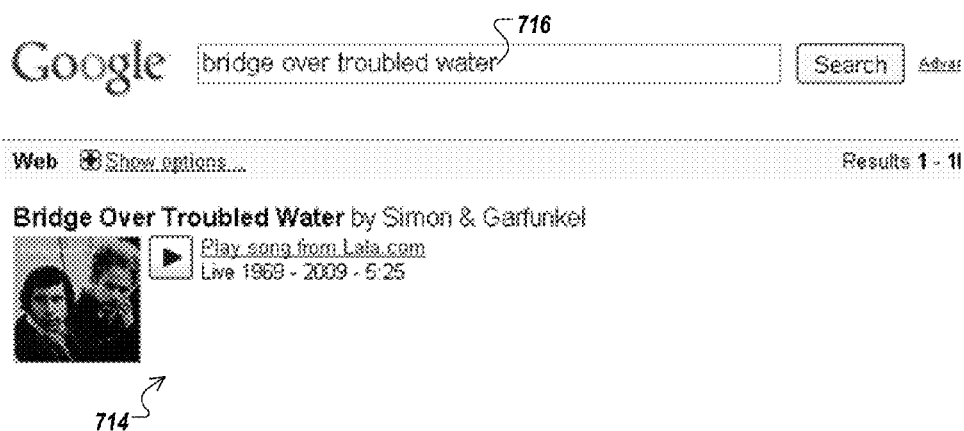

FIG. 7D illustrates a music answer box 614 presented in response to a query 616 for a song title. The answer box 614 identifies the title of the song "Bridge over Troubled Water" and the artist ("Simon & Garfunkel"). The answer box 614 also includes a link to play the song, along with information on the album on which the song was released and the length of the song.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a mobile device, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending Web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    maintaining a set of music sites, wherein a music site is a web site that provides access to music or music information;
    receiving a query;
    obtaining a plurality of search results responsive to the query, the search results being results from a search of web resources;
    determining a count of the plurality of search results that identify resources on respective music sites that are in the set of music sites;
    determining, by one or more computers, that the count of the plurality of search results that identify resources on respective music sites satisfies a threshold;
    in response to determining that the count of the plurality of search results that identify resources on respective music sites satisfies the threshold, obtaining music data for a song responsive to the query;
    generating a presentation of music information related to the query, the presentation of music information comprising a Uniform Resource Locator (URL) to song content of the song; and
    providing the presentation of music information and two or more of the search results in response to the query.

2. The method of claim 1, wherein maintaining the set of music sites comprises:
    determining an initial set of music sites; and
    determining one or more additional music sites that commonly co-occur as search results with one or more music sites in the initial set of music sites; and
    adding the one or more additional music sites to the set of music sites.

3. The method of claim 2, wherein determining an initial list of music sites comprises determining one or more music sites having a popularity that satisfies a threshold.

4. The method of claim 1, wherein maintaining the set of music sites comprises:
- receiving a search result that identifies a site, the search result having an associated title or URL;
- determining that the site is a music site including determining that the title or URL of the search result matches an artist name and song title pattern; and
- in response to determining that the site is a music site including determining that the title or URL of the search result matches an artist name and song title pattern, adding the site to the set of music sites.

5. The method of claim 1, wherein determining the count of the plurality of search results that identify resources on respective music sites that are in the set of music sites comprises determining a count of a number of top-ranked search results that identify respective music sites that are in the set of music sites.

6. The method of claim 1, further comprising:
- classifying one or more terms of the query as a musical artist name, a song title, or an album title; and
- identifying the song responsive to the query including identifying a song with a matching musical artist name, a song title, or an album title.

7. The method of claim 1, wherein the presentation comprises music data and respective links for each of one or more additional songs related to the song.

8. The method of claim 1, wherein the presentation of music information comprises a name of a musical artist, a name of a musical work, a duration of the song, a thumbnail image, or a title of a musical album.

9. A system comprising:
- one or more computers and one or more storage devices storing instructions that are operable, when executed by the one or more computers, to cause the one or more computers to perform operations comprising:
- maintaining a set of music sites, wherein a music site is a web site that provides access to music or music information;
- receiving a query;
- obtaining a plurality of search results responsive to the query, the search results being results from a search of web resources;
- determining a count of the plurality of search results that identify resources on respective music sites that are in the set of music sites;
- determining that the count of the plurality of search results that identify resources on respective music sites satisfies a threshold;
- in response to determining that the count of the plurality of search results that identify resources on respective music sites satisfies the threshold, obtaining music data for a song responsive to the query;
- generating a presentation of music information related to the query, the presentation of music information comprising a Uniform Resource Locator (URL) to song content of the song; and
- providing the presentation of music information and two or more of the search results in response to the query.

10. The system of claim 9, wherein maintaining the set of music sites comprises:
- determining an initial set of music sites; and
- determining one or more additional music sites that commonly co-occur as search results with one or more music sites in the initial set of music sites; and
- adding the one or more additional music sites to the set of music sites.

11. The system of claim 10, wherein determining an initial set of music sites comprises determining one or more music sites having a popularity that satisfies a threshold.

12. The system of claim 9, wherein maintaining the set of music sites comprises:
- receiving a search result that identifies a site, the search result having an associated title or URL;
- determining that the site is a music site including determining that the title or URL of the search result matches an artist name and song title pattern; and
- in response to determining that the site is a music site including determining that the title or URL of the search result matches an artist name and song title pattern, adding the site to the set of music sites.

13. The system of claim 9, wherein determining the count of the plurality of search results that identify resources on respective music sites that are in the set of music sites comprises determining a count of a number of top-ranked search results that identify respective music sites that are in the set of music sites.

14. The system of claim 9, wherein the operations further comprise:
- classifying one or more terms of the query as a musical artist name, a song title, or an album title; and
- identifying the song responsive to the query including identifying a song with a matching musical artist name, a song title, or an album title.

15. The system of claim 9, wherein the presentation comprises music data and respective links for each of one or more additional songs related to the song.

16. The system of claim 9, wherein the presentation of music information comprises a name of a musical artist, a name of a musical work, a duration of the song, a thumbnail image, or a title of a musical album.

17. A computer-implemented method comprising:
- maintaining a lyrics index database that associates song lyrics with lyrics resources that include the song lyrics;
- receiving a query;
- searching, by one or more computers, the lyrics index database using the query to obtain a lyrics result having a score;
- determining, by one or more computers, that the score of the lyrics result from the lyrics index database satisfies a threshold;
- in response to determining that the score of the lyrics result from the lyrics index database satisfies a threshold, obtaining music data for a song that responsive to the query;
- generating presentation of music information related to the query, the presentation of music information comprising a Uniform Resource Locator (URL) to song content of the song; and
- providing the presentation of music information and two or more of search results in response to the query.

18. The method of claim 17, further comprising:
- performing a search of web resources based on the query; and
- providing two or more search results from the search of the web resources in response to the query.

19. The method of claim 17, wherein the score of the lyrics result is based at least in part on a popularity of a song referenced by the lyrics result.

20. The method of claim 17, wherein the presentation comprises music data and respective links for each of one or more additional songs related to the song.

21. The method of claim 17, wherein the presentation of music information comprises a name of a musical artist, a name of a musical work, a duration of the song, a thumbnail image, or a title of a musical album.

22. A system comprising:
one or more computers and one or more storage devices storing instructions that are operable, when executed by the one or more computers, to cause the one or more computers to perform operations comprising:
receiving a query;
searching the lyrics index database using the query to obtain a lyrics result having a score;
determining that the score of the lyrics result from the lyrics index database satisfies a threshold;
in response to determining that the score of the lyrics result from the lyrics index database satisfies a threshold, obtaining music data for a song that responsive to the query;
generating presentation of music information related to the query, the presentation of music information comprising a Uniform Resource Locator (URL) to song content of the song; and
providing the presentation of music information and two or more of search results in response to the query.

23. The system of claim 22, wherein the operations further comprise:
performing a search of web resources based on the query; and
providing two or more search results from the search of the web resources in response to the query.

24. The system of claim 22, wherein the score of the lyrics result is based at least in part on a popularity of a song referenced by the lyrics result.

25. The system of claim 22, wherein the presentation comprises music data and respective links for each of one or more additional songs related to the song.

26. The system of claim 22, wherein the presentation of music information comprises a name of a musical artist, a name of a musical work, a duration of the song, a thumbnail image, or a title of a musical album.

* * * * *